(12) United States Patent
Kitahata et al.

(10) Patent No.: US 7,595,095 B2
(45) Date of Patent: Sep. 29, 2009

(54) COATED ARTICLE, MANUFACTURING METHOD THEREFOR AND COATING APPARATUS

(75) Inventors: Kouji Kitahata, Osaka (JP); Takeshi Tojo, Osaka (JP); Katsura Koyagi, Osaka (JP); Takanori Kurokawa, Nara (JP); Atsuo Suehiro, Aichi (JP); Yoshifumi Niide, Aichi (JP); Kouichi Taniguchi, Gifu (JP); Shingo Nakamura, Aichi (JP)

(73) Assignee: Koyo Seiko Co., Osaka (JP)

( * ) Notice: Subject to any disclaimer, the term of this patent is extended or adjusted under 35 U.S.C. 154(b) by 154 days.

(21) Appl. No.: 11/352,989

(22) Filed: Feb. 14, 2006

(65) Prior Publication Data

US 2006/0134344 A1    Jun. 22, 2006

Related U.S. Application Data

(60) Continuation of application No. 10/868,758, filed on Jun. 17, 2004, now Pat. No. 7,048,972, which is a division of application No. 10/329,709, filed on Dec. 27, 2002, which is a continuation of application No. 09/660,499, filed on Sep. 12, 2000, now abandoned.

(51) Int. Cl.
    *B05D 1/04* (2006.01)
(52) U.S. Cl. ........................ 427/481; 427/475
(58) Field of Classification Search .................. None
    See application file for complete search history.

(56) References Cited

U.S. PATENT DOCUMENTS

| | | | |
|---|---|---|---|
| 3,367,142 A | 2/1968 | Groves et al. | |
| 3,579,684 A * | 5/1971 | Duffy | ..................... 470/17 |
| 3,673,883 A | 7/1972 | Adams | |
| 3,999,445 A | 12/1976 | Liautaud | |
| 4,594,294 A | 6/1986 | Eichen et al. | |
| 4,610,577 A | 9/1986 | Spensberger | |
| 4,656,051 A | 4/1987 | Wojcik | |
| 5,096,352 A | 3/1992 | Lemelson | |

(Continued)

FOREIGN PATENT DOCUMENTS

EP    0 908 647    4/1999

(Continued)

OTHER PUBLICATIONS

Electrostatic Powder Coating J.F. Hughes, Research Studies Press Ltd, pp. 18-21, 1984.*

(Continued)

*Primary Examiner*—Frederick J Parker
(74) *Attorney, Agent, or Firm*—Nixon & Vanderhye P.C.

(57) ABSTRACT

A method of making a coated article is provided. The method includes electrostatically depositing powder onto a metallic article to be coated using an electrostatic spray gun while the metallic article is being rotated around its axis such that the powder is deposited around the entire circumference of the metallic article at least in a radially outward peripheral region having projections and depressions and that the powder deposited on top of the projections is larger in thickness than the powder deposited in other parts of the metallic article. Melting of the powder is performed by induction heating the metallic article to make a coating film adhere to the metallic article.

17 Claims, 7 Drawing Sheets

U.S. PATENT DOCUMENTS

| | | | |
|---|---|---|---|
| 5,176,755 A | | 1/1993 | Winkle, Sr. et al. |
| 5,288,556 A | | 2/1994 | Lemelson |
| 5,306,346 A | * | 4/1994 | DiMaio et al. ................ 399/9 |
| 5,852,951 A | | 12/1998 | Santi |
| 5,903,965 A | * | 5/1999 | Fletcher et al. .............. 29/458 |
| 6,156,392 A | * | 12/2000 | Duffy et al. ................ 427/475 |

FOREIGN PATENT DOCUMENTS

| | | | | |
|---|---|---|---|---|
| EP | 0 908 647 | A2 | | 4/1999 |
| JP | 56-34153 | | | 8/1981 |
| JP | 56-34153 | B2 | | 8/1981 |
| JP | 2556739 | | | 9/1996 |
| JP | 2556739 | B2 | | 9/1996 |
| JP | 2725168 | B22 | | 12/1997 |
| JP | 10-257727 | | | 9/1998 |
| JP | 10-296182 | A | | 11/1998 |
| JP | 11-182636 | | | 7/1999 |
| JP | 11-182636 | A | | 7/1999 |
| JP | 2000-161377 | | * | 6/2000 |

OTHER PUBLICATIONS

U.S. Appl. No. 10/868,758, filed Jun. 17, 2004.
U.S. Appl. No. 10/329,709, filed Dec. 27, 2002.
U.S. Appl. No. 09/660,499, filed Sep. 12, 2000.

* cited by examiner

COATED ARTICLE, MANUFACTURING METHOD THEREFOR AND COATING APPARATUS

CROSS-REFERENCE TO RELATED APPLICATIONS

This application is a continuation of application Ser. No. 10/868,758 filed Jun. 17, 2004 (now U.S. Pat. No. 7,048,972), which is a divisional of application Ser. No. 10/329,709 filed Dec. 27, 2002, which is a continuation of Ser. No. 09/660,499 filed Sep. 12, 2000 now abandoned, the entire contents of which are hereby incorporated herein by reference in this application.

BACKGROUND OF THE INVENTION

The present invention relates to a method for forming a coating film at uniform thickness on metallic articles having projections and depressions defined by or defining the projection, particularly gears and spline shafts. The present invention also relates to a method of manufacturing coated articles such as coated gears and spline shaft, and to a coating apparatus.

Metallic spline shafts and metallic gears for use in motive power or motion transmission are formed with a resin coating to impart thereto wear resistance, cushioning property, soundproof property or muffling property. In the case where such a resin coating is formed by fluidization dipping process, the resulting coating become large in thickness because of large thermal capacity of the articles (such as gears etc.), while an attempt to make the coating into a thin film would cause the coating levelness to lower, making it difficult to form a uniform coating with high precision. Therefore, for example, after coating to a film thickness of 300 µm or more (in particular, about 500-600 µm) by fluidization dipping process, the coating is subjected to machining process to form a coating film of about 200±20 µm. However, this method involves the machining process at the crests and troughs, or roots, of teeth of gears, resulting in not only lowered production efficiency but also increased cost.

Meanwhile, it is also practiced that a powder bed is formed by applying an electrostatic powder coating to gears or spline shafts, and then a heating process is performed to form a coating film. With this method, unfortunately, larger-sized gears or spline shafts would take prolonged time for elevation of the object temperature by an oven. Moreover, since the temperature elevation begins with the surface of the powder bed in the oven, rapid heating, if applied, would involve scaling and/or flaking, namely detachment, of the coating film and/or occurrence of pinholes, thus making it difficult to form a large-thickness coating film uniformly.

In order to solve the problems with the oven, electrostatic powder coating process and high frequency induction heating process are practiced in combination to form a coating film. For example, a Japanese publication JP-A-10-296182 discloses to form a resin powder bed (thermosetting resin powder bed of epoxy resin or the like) by electrostatic powder coating process on a continuous metallic body of a metal wire, metal tube, metal bar and the like, and then fuse the inside layer of the powder bed by induction heating process to have the inside layer adhere to the metallic body while forming a semi-fused resin layer at the top surface of the powder bed, and perform further heating to finally form a completely fused resin coating film. Japanese Patent No. 2725168 discloses a method for manufacturing an anticorrosion-coated steel stranded wire including the steps of temporarily undoing a steel stranded wire into a core wire and individual side wires, depositing resin powder onto the core wire and the side wires, heating the core wire and the side wires during the process of re-stranding them so that an incompletely set coating layer is formed around the outer periphery and between the core wire and each side wires, and further heating the re-stranded steel wire so that the coating layer is completely set.

Further, the Japanese publication JP-B2-56-34153 discloses an insulating-coating formation method including the steps of depositing a powder coating material onto an article having an uneven surface, while the article is being rotated, within an electrostatic fluidized dipping vat in which a 100-250 mesh powder coating material is fluidized and electrified, removing unnecessary powder coating material from projections of the article by a brush-equipped suction means while rotating the article, and heating the article by induction heating of about 100-200 kHz to thereby fuse and fix the powder coating material. In this method, in order to ensure electrical insulation at depressions as in the motor rotor while avoiding the formation of coating film at projections, a thicker powder bed is formed by electrostatic-fluidized dipping process using a 100-250 mesh powder coating material (epoxy resin coating material), and then the powder bed of projections where the coating film is unnecessary is removed, leaving the thick film only at the depressions.

However, the electrostatic powder coating process and the electrostatic-fluidized dipping process, which use electrified powder particles, inevitably involve increased film thicknesses at crests (tip portions) of the teeth and reduced film thicknesses at troughs and side walls due. to the electrical repulsion of the charged particles. In particular, removal of the powder bed at the projections by a brush-equipped suction means during the rotation of the article may cause, in some cases, the powder at the projections to fall into the depressed portions. As a result, even with induction heating, articles having a region having projections and depressions (e.g., toothed portions of gears and spline shafts, etc.) cannot be coated with a uniform coating film.

SUMMARY OF THE INVENTION

Accordingly, an object of the present invention is to provide a method of manufacturing a coated article (e.g., gears, etc.) which is coated in at least a region having projections and depressions defined by or defining the projections, such as a toothed portion, with a coating film of uniform thickness even though the film is a thick film, as well as providing a coating apparatus for use in manufacturing such a coated article.

Another object of the invention is to provide a method of manufacturing a coated article (e.g., gears, etc.) being high in both muffling property and wear resistance and having a uniform film thickness distribution, as well as providing a coating apparatus for use in manufacturing such a coated article.

Another object is to provide a method of forming a coating film of uniform thickness, even with a large film thickness, on a surface of an article in a region having projections or depressions, such as a toothed portion.

A further object of the invention is to provide a coated article manufacturing method capable of obtaining specified dimensions of a coated article, even if the article has a region containing projections and depressions, e.g., a toothed portion, and the thickness of the coating film differs between the projections and the depressions, by previously setting dimensions of the article to be coated.

As a result of energetic discussions to achieve the above objects, the inventors found out that by conversely taking advantage of the fact that in the case of electrostatic powder coating, gears become thicker in coating film thickness at the tip or crest portions of the teeth than at trough or root portions and side walls of the teeth, a powder bed uniform in thickness as a whole would be able to be formed by performing an electrostatic powder coating process all over a surface of an article to be coated (particularly, gears and spline shafts) and thereafter removing the powder bed present at tip portions of projections (tooth tips, or crests) and further performing an electrostatic powder coating process over the surface, while a coating film of uniform thickness can be obtained by heating the thus formed powder bed from its inside by induction heating. This is how the present invention was made.

Accordingly, a method for manufacturing a coated article according to an aspect of the present invention comprises the steps of:

performing electrostatic powder coating process to form a primary powder bed in at least a region of an article to be coated, said region having projections and depressions defined by or defining the projections;

removing the primary powder bed from a tip portion of each projection by a specified thickness;

performing electrostatic powder coating process to form a secondary powder bed over at least said region from which the primary powder bed at the tip portions of the projections has been removed by the specified thickness; and melting the primary and secondary powder beds by induction heating to form a coating film on the article.

With this method, a coated article (e.g., coated gears) having a coating film of uniform thickness formed at least in a region having projections and depressions of the article can be obtained. Therefore, the method of the invention is useful also as a method for forming a coating film of uniform thickness on an article to be coated (e.g., gears) in a region having projections and depressions defined by or defining the projections (in particular, a toothed portion).

The article to be coated that has a region having projections and depressions defined by or defining the projections can be exemplified by a variety of gears and spline shafts and the like. It is to be noted that the terms "gears" and "spline shafts" used herein should be interpreted in a broad sense, and the "gears" include, for example, spur gears, internal gears, helical gears, double helical gears, rack and pinion, bevel gears, screw gears, skew gears, worm and worm wheel, etc., while the "spline shafts" include ordinary spline shafts (grooved shafts), serrated shafts with spline teeth having a shape of chevron in cross section, and the like.

In one embodiment, the step of removing the primary powder bed includes scraping the primary powder bed while removing the scraped powder by suction, so that the scraped powder is prevented from falling off and depositing onto the bottom portions of the depressions or side walls of the projections (roots, faces or flanks of teeth).

For the electrostatic powder coating, powder coating materials having a mean particle size of 5-100 μm (e.g., thermoplastic resin-based powder coating materials such as nylon resins) are usable.

The thickness of the coating film to be formed by electromagnetic induction heating may be selected according to the type of the article to be coated. For the coating of gears and spline shafts, thick coating films having a thickness within a range of about 100 to 300 μm, especially about 150-200 μm may be formed. As described above, the deposition amount or coating weight of powder coating material is larger at the tip portions of the projections than at bottoms of depressions or side walls of the projections. Therefore, with a view to forming a coating film of uniform thickness, preferably, a ratio of a coating weight A ($g/m^2$) of the primary powder bed to a coating weight B ($g/m^2$) of the secondary powder bed may fall within a range of A/B=approx. 20/80 to 80/20.

A coating apparatus according to another aspect of the invention, comprises:

coating means performing electrostatic powder coating on an article to be coated (e.g., gears) having a region containing projections and depressions defined by or defining the projections (e.g., a toothed portion), to form a primary powder bed on a surface of the article in said region;

scraper means removing the powder bed from a tip of each projection (e.g., tooth crest or tip portions) of the article;

coating means performing electrostatic powder coating on the article from which the powder bed at the tip portions of the projections has been removed by the scraper means, to form a secondary powder bed over the entire surface of the article in said region; and induction heating means melting the primary and secondary powder beds.

In the process of powder coating by the coating apparatus, for such articles as gears and spline shafts, primary and secondary coatings will be applied to the articles while the articles are being rotated about their center axis.

In order to prevent the powder scraped by the scraper means from falling off and depositing onto the bottom portions of the depressions and/or side walls of the projections (e.g., roots, faces or flanks of the teeth), the coating apparatus may further comprise means for sucking up powder scraped off the powder bed. The scraper means itself may be equipped with such a suction means. Also, the scraper means may be movable in the axial direction of the article.

A method for manufacturing a coated article, according to still another aspect, comprises the steps of:

electrostatically depositing powder onto an article to be coated, said article having projections and depressions defined by or defining the projections; and melting the powder by induction heating the article to thereby make a coating film adhere to the article.

In this method, an article to be coated having projections and depressions defined by or defining the projections is induction-heated in the state that powder has been electrostatically deposited on the article, to melt the powder. That is, the powder bed is heated by the article itself inside the powder bed. As a result, air bubbles become more likely to escape out of the internally melted powder to the outside, so that air bubbles are prevented from being included in the coating film.

The powder deposit on the article may have different thicknesses. Then, the dimensions of the article before being coated may be previously set according to the thicknesses of the powder deposit so that the resulting coated article has desired outer dimensions (e.g., an outer diameter). In this case, a secondary finishing process (e.g., broaching) is no longer necessary, allowing the working cost to be reduced.

To previously set the dimensions of the article according to the thicknesses of the powder deposit, the method may further comprise a step of cutting tips of the projections of the article to be coated before the step of electrostatically depositing powder.

In an embodiment, the thickness of the coating film is set to 100 μm to 250 μm. As a result, working noise (tap tone) of this coated article can be reduced to a specified desired value or lower, and wear can also be reduced. With the film thickness below 100 μm, working noise (tap tone) would be over the specified value. With the film thickness over 250 μm, not only working noise would not be significantly reduced but also wear would increase.

The present invention also provides a coated article having a specified outer dimension (e.g., an outer diameter) and having a coating film, wherein substantially no air bubbles are present in the coating film. The coated article may have the coating film either partially or entirely. In the coated article, no air bubbles are present in the coating film. Thus, the coating quality is improved.

In one embodiment, the thickness of the coating film is substantially same in all portions thereof. A difference between a film thickness of the coating film at a thickest portion and a film thickness thereof at a thinnest portion may be within a range of from 0 μm to 40 μm.

In another embodiment, the coating film has different film thicknesses, and the article before being coated has dimensions set according to the film thicknesses of the coating film. In this case, a secondary finishing process (e.g., broaching) is no longer necessary, allowing the working cost to be reduced.

The coated article may further include an undercoat under the coating film.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way or illustration only, and thus are not limitative of the present invention, and wherein.

DETAILED DESCRIPTION OF THE PREFERRED EMBODIMENTS

Hereinbelow, the present invention is described in detail with reference to the accompanying drawings.

First Embodiment

Figure 2:
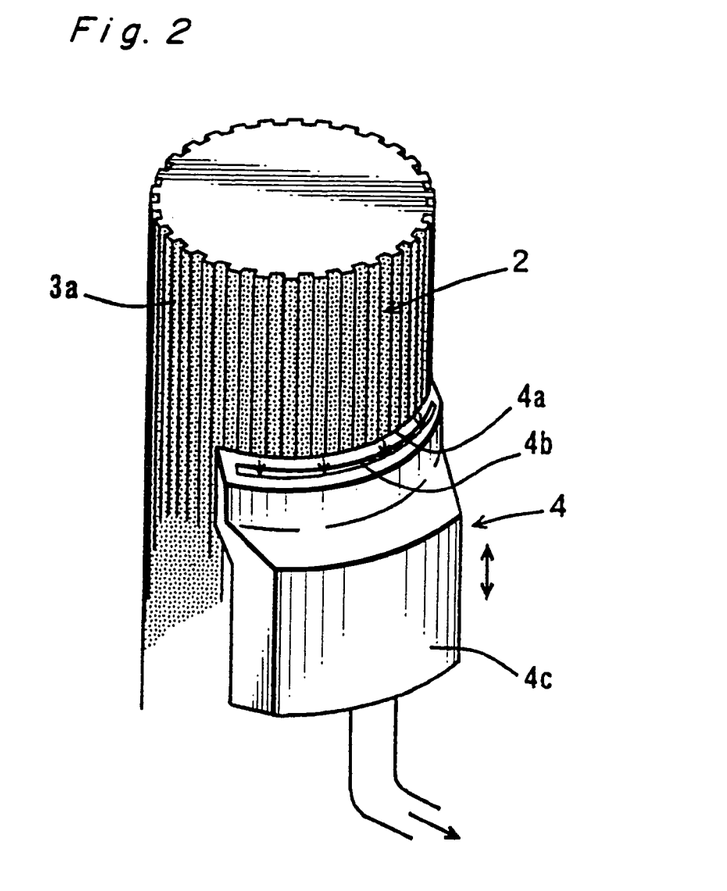
FIG. 2 is a schematic perspective view showing a scrapped state by a scraper means.
Figure 3:
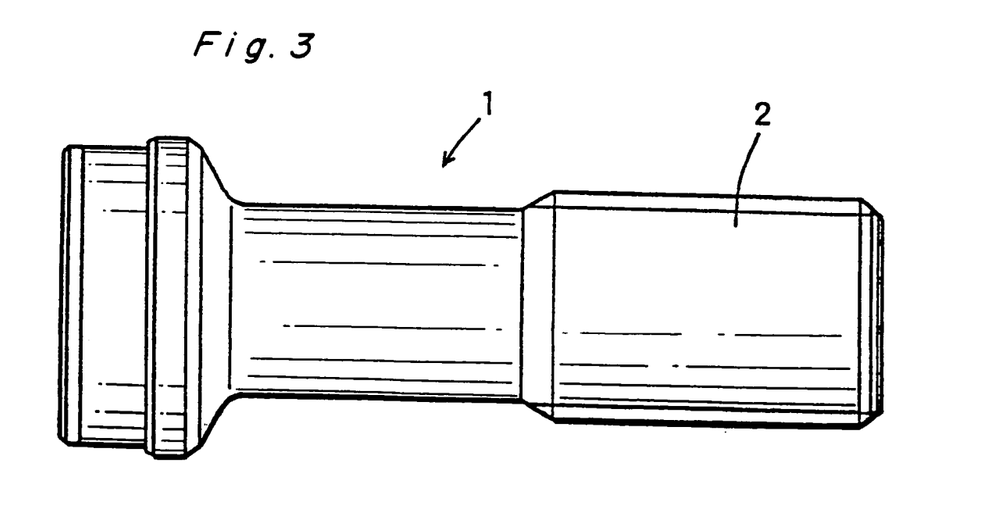
FIG. 3 is a schematic side view of a spline shaft.

FIGS. 1A-1D are process charts showing an example of coating process on a toothed portion of a spline shaft. FIG. 2 is a schematic perspective view showing a scrapped state by a scraper, and FIG. 3 is a schematic side view of the spline shaft.

(Primary Powder Bed Formation Step)

Figure 1A:
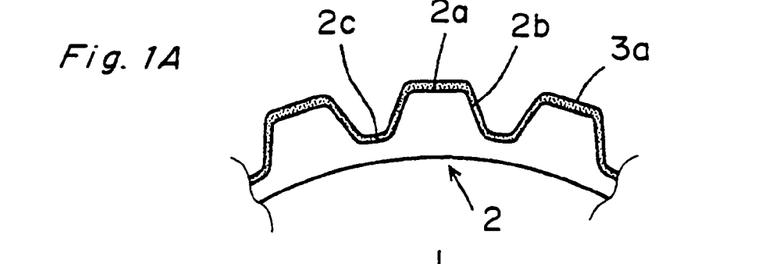
FIGS. 1A, 1B, 1C and 1D are process charts showing an example of a coating process on a toothed portion of a spline shaft according to an embodiment of the invention.

In a step for forming a primary powder bed shown in FIG. 1A, electrostatic powder coating process is performed to form a primary powder bed on a surface of an article to be coated. In this example, first, a spline shaft 1 is preprocessed and primer-processed, and while being rotated around its axis, the spline shaft 1 is coated by electrostatic powder coating process with an electrostatic spray gun as a coating means. By these processes, a primary powder bed 3a made of a nylon resin-based powder coating material is formed over an entire surface of a toothed portion (namely, a keyway portion) 2 of the spline shaft 1, including crests, or top lands, 2a, sides 2b, and roots, or bottoms, 2c of teeth.

The preprocessing of the metallic article to be coated includes surface treatments such as degreasing process, pickling process, electrolytic process, anodic oxidation process, and chemical conversion process, as well as surface finishing processes such as shot blasting. The primer process may be achieved by applying conventional methods, for example, by applying, to the article to be coated, organic primers containing such resins as epoxy resin, phenol resin, polyvinyl acetal resin and rubber or oligomer, inorganic primers containing such metallic components as magnesium, manganese and silicon, or mixed primers of these. Further, if necessary, the article may be offered for electrostatic powder coating with its non-targeted sites masked.

As the powder coating material, are available powder particles based on various types of thermoplastic resins or thermosetting resins usable as electrostatic powder coating material. The thermoplastic resins can be exemplified by olefinic resins (including polyethylene, polypropylene or other olefins alone or their copolymers, ethylenic copolymers such as ethylene-vinyl acetate copolymer, ethylene-(meth)acrylate or their salts (e.g., ionomers, etc.), propylene copolymers such as propylene-ethylene copolymer or propylene-butene copolymer, and the like), acrylic resins, vinyl chloride resins, nylon resins, polyester resins, and the like. The thermosetting resins can be exemplified by epoxy resins, thermosetting polyester resins, thermosetting acrylic resins, and the like. The thermosetting polyester resins and the thermosetting acrylic resins may be combined with crosslinking agents or curing agents (e.g., amino resins, such as melamine resin, etc.) to form thermosetting resins.

Preferable resins are thermosetting resins (e.g., polyethylene resins, nylon resins, etc.) which are high in wear resistance, shock resistance and durability and high in adhesion to metal, in particular, nylon resins. The nylon resins can be exemplified by homopolymerized nylons such as 6-nylon, 66-nylon, 46-nylon, 610-nylon, 616-nylon, 11-nylon, 12-nylon and 13-nylon, and copolymerized nylons such as 6/12-nylon and 66/12 nylon. Preferable nylon resins include homopolymerized and copolymerized nylons containing at least one nylon component selected from 11-nylon and 12-nylon.

Mean particle size of the powder coating material is normally smaller than those of powder coating materials used for fluidization dipping process and electrostatic-fluidized dipping process. For example, the mean particle size may be selected from a range of 5-100 μm (e.g., 10-70 μm, more particularly, 10-50 μm).

In powder coating process, since the amount of powder deposition at the crests 2a of the toothed portion 2 is larger than that at the sides 2b and bottoms 2c of the toothed portion 2 due to the electrostatic repulsion of charged powder particles or the like, coating film of uniform thickness cannot be formed even by heating the primary powder bed 3a with induction heating. In particular, as the coating film thickness becomes larger, the amount of powder deposition at the sides 2b and bottoms 2c of the toothed portion 2 decreases considerably, compared with the amount of powder deposition at the crests 2a of the toothed portion 2, causing the uniformity of the film thickness to lower considerably.

(Scraping Step)

Figure 1B:
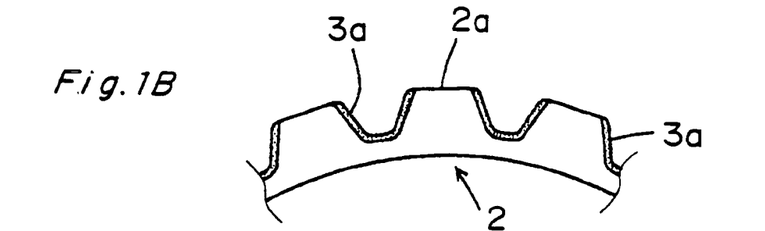

Therefore, in the present invention, in a scraping step shown in FIG. 1B, the primary powder bed 3a deposited on the tooth crests 2a of the toothed portion 2 is scraped by a scraper 4 (see FIG. 2), where the powder is sucked while being scraped, thereby removed, in order that the powder is prevented from falling off and depositing onto the sides or bottoms of the toothed portion. In this example, the scraper 4 is made up of a thin base piece 4a which is semicircularly bent in correspondence to the degree of curve of the crests (namely, outer peripheral surface) of the spline shaft 1 and which has at its front end a doctor blade for scraping the primary powder bed 3a, a slit 4b formed in the base piece 4a at a specified distance from the edge of the doctor blade, and a suction portion 4c for sucking from the rear the powder guided to this slit.

The scraper 4 is movable relative to the spline shaft and along its axis so as to efficiently remove the primary powder bed 3a from a plurality of tooth crests 2a.

It is also conceivable to scrape the powder bed with a brush. However, using a brush would cause not only the powder bed deposited on the tooth crests to drop into the trough portions, but also the powder bed at the troughs to be scraped off, so that the surface of the toothed portion could no longer be coated overall with a coating film of uniform film thickness.

(Secondary Powder Bed Formation Step)

Figure 1C:
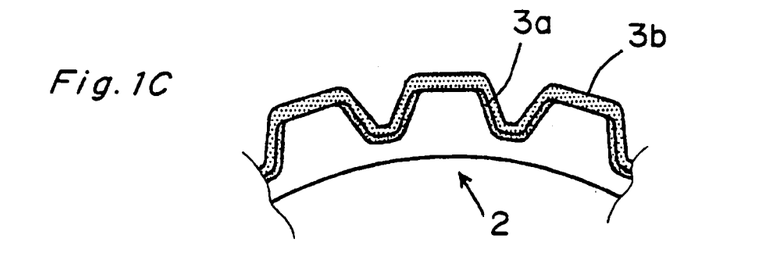

In a secondary powder bed formation step shown in FIG. 1C in which the powder bed 3a of the crests 2a has been removed, the spline shaft 1 as an article to be coated, while being rotated about its center axis, is electrostatically powder-coated in the toothed portion 2 with the electrostatic spray gun as a coating means, by which a secondary powder bed 3b is formed on the entire surface of the toothed portion 2 of the spline shaft 1. That is, the crests 2a of the toothed portion 2 are coated mainly with the secondary powder bed 3b, while the bottoms 2c and sides 2b of the toothed portion 2 are coated with a laminated powder bed composed of the primary powder bed 3a and the secondary powder bed 3b. Thus, the surface of the toothed portion 2 can be coated over all with a powder bed of uniform thickness.

More specifically, use of the same kind of coating material normally allows the thickness of the coating film to correspond to the amount of powder deposition or the thickness of powder bed. Therefore, given a powder deposition amount X1 at the tooth crests of the toothed portion by the primary coating process, a powder deposition amount X2 at the bottoms and sides of the toothed portion (where X1>X2, ΔX=X1−X2), a powder deposition amount Y1 at the tooth crests of the toothed portion by the secondary coating process, and a powder deposition amount Y2 at the bottoms and sides of the toothed portion (where Y1>Y2, ΔY=Y1−Y2), and if the primary powder bed and the secondary powder bed are formed so that a relationship of Y1=X2+Y2 is satisfied, then a coating film of uniform thickness can be formed on the surface of the toothed portion because substantially all the primary powder bed has been scraped off the tooth crest portions.

In a region or place having projections or depressions of an article, the amounts of powder deposition on the crest portions, trough portions and side walls vary depending on the geography or configuration of the place (angular acuteness of crest portions, depth of trough portions, interval and pitch of crest portions and trough portions, etc.). Therefore, measuring relationship between the deposition amount of the powder material and the thickness of the coating film beforehand by experiments makes it possible to form a coating film of uniform thickness even in a region having projections or depressions, according to the shape and type of the article to be coated.

Powder deposition amounts (g/m$^2$) for the primary powder bed and the secondary powder bed in a region having projections and depressions defined by or defining the projections of an article can normally be selected, according to the shape and size of the article in that region, such that the ratio of deposition amount A (g/m$^2$) of the primary powder bed to deposition amount B (g/m$^2$) of the secondary powder bed falls within a range of A/B=approx. 20/80-80/20 (preferably, approx. 25/75-75/25, more preferably approx. 30/70-70/30).

Further, since the amount of powder deposition corresponds to the thickness of the powder bed and the thickness of the coating film, the above relationship in powder deposition amount between the first and second powder beds corresponds not only to a relationship between the thickness of the primary powder bed and the thickness of the secondary powder bed, but also to a relationship between the thickness of the primary coating based on the primary powder bed and the thickness of the secondary coating based on the secondary powder bed.

The deposition amounts for the powder beds can easily be controlled by spray amount (discharge amount) and spray time of powder coating material. For example, according to the thickness of the final coating film, in the primary powder bed formation step, the primary powder bed can be formed through electrostatic coating by spraying powder coating material for about 5-60 seconds (e.g., 10-40 seconds) from a spray gun, and in the secondary powder bed formation step, the secondary powder bed can be formed through electrostatic coating by spraying powder coating material for about 5-180 seconds (e.g., 10-120 seconds).

(Induction Heating Step)

Figure 1D:
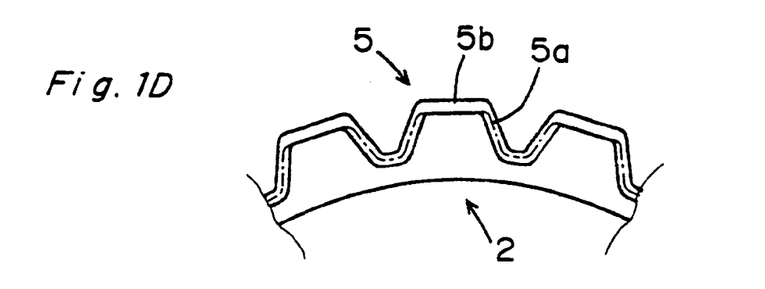

Then, as shown in FIG. 1D, a coating film 5, which is a nylon resin based thick film, is formed at a uniform thickness at the toothed portion 2 of the spline shaft 1 through the steps of electromagnetic induction heating with induction heating means (induction heater or the like), cooling by radiational cooling or the like, and if necessary, removal of the masking at non-coated sites. This coating film 5 is composed of a primary coating film 5a corresponding to the primary powder bed 3a and a secondary coating film 5b corresponding to the secondary powder bed 3b, although there is seen no boundary between the films 5a and 5b if same powder coating material is used for the first and second powder beds 3a and 3b. With the toothed portion 2 of the thus obtained coated spline shaft 1 set into a boss so that the toothed portion 2 is movable along the axial direction, occurrence of noise due to the engagement of the toothed portion 2 with the boss can be prevented, and wear resistance and corrosion resistance can also be improved. As a result, the spline shaft is enabled to transfer motion or motive power with noise muffled and with security.

By making use of the induction heating, the primary powder bed 3a and the secondary powder bed 3b are fused by being heated from the inside of the powder bed, by which the coating film 5 of uniform thickness can be formed within a short time efficiently on the surface of the toothed portion. That is, the nylon resin-based powder coating material is not only high in melting point or softening point, but also high in dielectric constant and thus low in electric insulation property and small in amount of electrostatic charge, as compared with resins such as epoxy resin. Therefore, the adhesion by static electricity considerably lowers with increasing thickness of the powder bed. Thus, heating such a powder bed by an ordinary oven, which causes the surface of the powder bed to be melted but its interior to remain in a powder state, would involve an excessive heating process, making it impossible to form a coating film of uniform thickness.

In contrast to this, use of induction heating, which allows the powder bed to be heated and melted from its interior, makes it possible to form a coating film of uniform thickness efficiently even if the powder bed has a large thickness. In applications to spline shafts and gears, for example, a coating film of uniform thickness can be formed on the surface of the toothed portion by electrostatic powder coating even if the coating film thickness is comparatively large. In particular, coated gears and spline shafts in which the coating film thickness (mean value) at the tooth crest portion, bottom portion and side portion is about 100-300 μm (particularly, 150-200 μm) and in which the difference in film thickness between the coating film at the tooth crest and the coating film at the bottom and side is 0-40 μm (preferably, 0-30 μm, more preferably 0-20 μm) in average can be formed easily.

With the use of a resin-based powder coating material having a high electric insulation property and a large amount of electrostatic charge and a low melting point or softening point, there are some cases where induction heating causes the interior of the powder bed to melt and flow out because of its lower melting point, making it difficult to form a coating film having a large thickness. Even in such a case, by controlling the heating conditions of the induction heating means (induction heater or the like), a thick coating film can be formed according to the characteristics of the powder coating material.

The induction heating may be done by using conventional high frequency induction heating equipment, where the frequency of induction heating may be, for example, about 0.5-200 kHz (e.g., 0.5-100 kHz, preferably 1-80 kHz, more preferably 5-70 kHz, particularly 10-50 kHz).

In the primary powder bed and/or secondary powder bed formation step(s), for articles to be coated having a center axis (e.g., gears), it is advantageous that the article is subjected to electrostatic powder coating while being rotated about its axis, for higher coating efficiency. However, it is not necessarily required that the article is rotated during the electrostatic coating process. For example, platy articles to be coated having depressed portions or grooves may be subjected to electrostatic coating while being moved vertically or horizontally along its longitudinal direction. Also, the primary powder bed and/or secondary powder bed may be formed over a surface of the article only in the region having projections and depressions. It is noted that either the same powder coating material or different powder coating materials may be used for the primary coating and the secondary coating.

In the scraping step (or selective removal step) for removing the powder at the tip portions of the projections, various removal means such as a scraper may be used according to the type and shape of the article to be coated. The powder may be scraped off the bed in directions crossing or perpendicular to the direction in which the projections (e.g., teeth) extend, but scraping along the projections would be more efficient. The doctor blade of the scraper may be made of, for example, paper, plastic, rubber, metal or the like, where it is advantageous to form the doctor blade from an electrically non-chargeable base material (or electrically conductive base material) in order to prevent deposition of charging particles.

For example, in the case where the powder bed formed at the projections of a cylindrical rod (article to be coated) having grooves extending in the axial direction is scraped while being moved relative to a scraper in the is axial direction, the scraper may be a scraper having a hollow, cylindrical doctor blade curved in accordance with the curvature of the outer periphery of the article, or a scraper having a semi-circular or ¼ circular shaped doctor blade, or the like. In the case where the powder bed formed at the projections of a prismatic rod (article to be coated) having grooves extending in the axial direction is scraped off by a scraper moving relative to the rod in the axial direction of the rod, the scraper may be a scraper having an L-shaped or platy doctor blade. Further, in the case where the powder bed formed at projections of a platy body having grooves is scraped off, the scraper may be a scraper having a flat plate shaped doctor blade.

In the scraping step, the powder bed of the projection tips does not need to be removed entirely and may be removed by a specified thickness or, unless film thickness is largely affected, may be removed roughly to some extent.

In the removal step, preferably, the scraped powder is removed by a suction device in order that the powder bed at the projections is prevented from falling into the depressions. This suction device is normally equipped with a motor and a fan for sucking up the scraped powder through the slit, and a filter for regulating the passage of the sucked powder.

Figure 8:
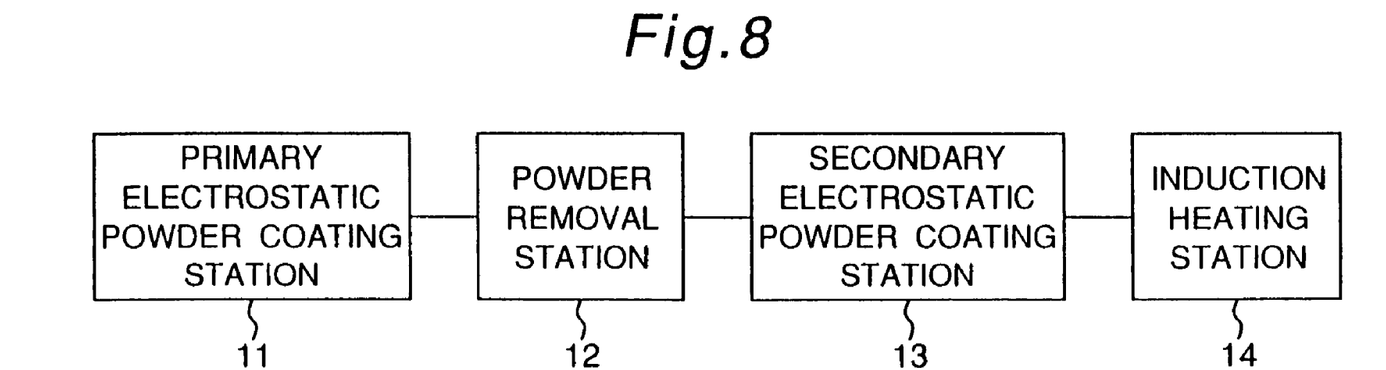
FIG. 8 is a block diagram showing an example of the coating apparatus to be used for manufacturing a coated article of the invention.
Figure 9:
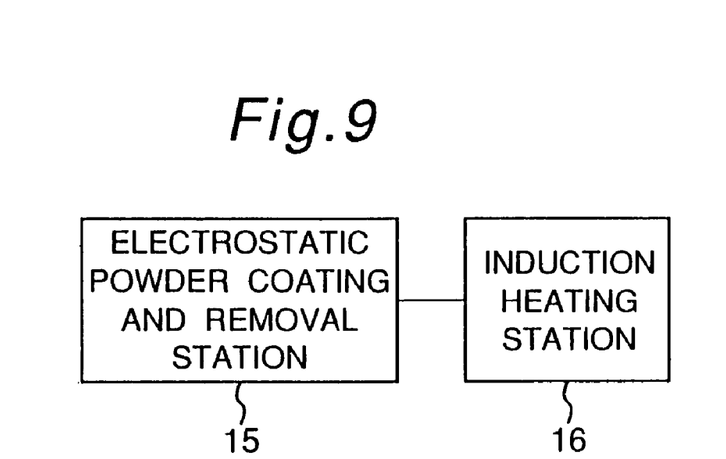
FIG. 9 is a block diagram showing another example of the coating apparatus.

The primary powder bed formation step, the scraping step, the secondary powder bed formation step and the induction heating step may be carried out independently, but for higher productivity, it is advantageous to perform those steps as an automatized sequence of steps. For example, the coating film may be formed by (1), as shown in FIG. 8, a sequence of steps of forming a primary powder bed on an article at a primary electrostatic powder coating station 11, then transferring the article to a powder removal station 12 and there scraping off the powder bed at the projection tips, next transferring the article to a secondary electrostatic powder coating station 13 and there forming a secondary powder bed by electrostatic coating, and transferring the article to an induction heating station 14 and there subjecting the article to an induction heating step, or by (2), as shown in FIG. 9, forming a primary powder bed on the article by electrostatic coating at an electrostatic powder coating and removal station 15, then scraping off the powder bed and further forming a secondary powder bed by electrostatic coating at the same place without transferring the article, next transferring the article to an induction heating station 16, and subjecting the article to an induction heating step. In the latter case (2), the number of transfer steps for the article is reduced. Besides, the coating film can be formed by electrostatic coating without involving any substantial changes or modifications of the coating line.

In the induction heating step, the article is heated to a temperature corresponding to the type of the powder coating material. If the powder coating material is a thermosetting resin-based material, the coating film may be crosslinked or cured by induction heating or by a heating process subsequent to the induction heating process as required. Also, the article may be heated in advance before an electrostatic powder coating process is carried out.

In this embodiment, the primary powder bed 3a and the secondary powder bed 3b are formed at the toothed portion 2 in two steps. However, if there is a large difference in level between the tooth root and the tooth crest, the film thickness can be uniformized by executing three times of powder formation steps and by controlling the film thickness at the individual steps. It also becomes possible to set film thickness to desired values in correspondence to individual portions of the tooth. For example, the film thickness can be set thinner at the tip portion of the tooth and thicker at the trough portion.

The present invention is effective as a method for forming a coating film of uniform thickness (particularly a thick coating film) on a surface of a region having projections or depressions of a metallic article by electrostatic powder coating. The types of the articles to be coated having a region containing projections or depressions are not particularly limited, and the articles may have various shapes such as platy, rod-like, cylindrical, disc-like, umbrella-like shapes. The present invention is suitable for coating film formation on articles to be coated having regular projections or depressions, especially gears and spline shafts.

The thickness of the coating film in the region having projections and depressions defined by or defining the projections may be selected according to the type of the article to be coated, and is, for example, about 100-200 µm, preferably 150-200 µm. Thickness variation of the coating film at the projections and depressions is, normally, about ±20 µm (particularly, ±15 µm).

The gears include gears in a wide sense capable of transmitting motive power or motion in mesh with one another, exemplified by gear wheels (spur gears, internal gears, helical gears, double helical gears, rack and pinion, straight bevel gears, screw gears, skew gears, worm gears, etc.). The spline shafts include ordinary spline shafts (grooved shafts), serrated shafts with spline teeth of chevron-shape in cross section, and the like. For spline shafts, the coating film has only to be formed at least at the toothed portion. The teeth of the gears and spline shafts are not limited to a particular shape and may be involute or cycloid. The cross-sectional shape of the addendum (top portion) of the teeth may be of an acute salience shape or acute curved shape, but normally may be so shaped as to have a curved tooth crest or top land with a curvature corresponding to the addendum circle, as in a grooved shaft in which axially extending grooves are formed circumferentially at intervals. For the spline shafts, the number of grooves is not particularly limited and, normally, may be about 4-50 grooves (e.g., 10-20 grooves).

EXAMPLE

The present invention is described below in more detail based on an example thereof, but the present invention is not limited by the example.

While a spline shaft was being rotated, a 12-nylon-based powder coating material (mean particle size: 32 µm) was applied to the spline shaft at its toothed portion (namely a keyway section, where deddendum circle diameter: 46 mm φ, length: 80 mm, keyway count: 20) for 20 seconds by electrostatic powder coating by using an electrostatic spray gun, by which a primary powder bed was formed. While a sheet curved in correspondence to the curvature of the addendum circle was being moved upward along the axis of the spline shaft, the primary powder bed at the tooth crests was scraped off, and moreover removed by suction. Then, by using the electrostatic spray gun and the powder coating material, the toothed portions of the spline shaft were subjected to a 20-second electrostatic powder coating process, by which a secondary powder bed was formed. Thereafter, the spline shaft was heated by an induction heater (frequency: 27 kHz), and thus a coating film was formed. The toothed portion of the resulting spline shaft was cut in a direction perpendicular to the center axis of the shaft into pieces, and film thicknesses were measured at the tooth crest, right and left sides, and the bottom or tooth root, three sites for each. By taking mean values of the measurements, the film thickness was evaluated. It is noted that the film thickness of each cut piece was measured at four sites shifted from each other circumferentially by 90 degrees.

Comparative Example

While a spline shaft was being rotated, a 12-nylon-based powder coating material (mean particle size: 32 µm) was applied for 40 seconds by electrostatic powder coating onto a toothed portion of the spline shaft (namely, a keyway area, where deddendum circle diameter: 46 mm length: 80 mm, keyway count: 20) by using an electrostatic spray gun. Thereafter, the spline shaft was heated by an induction heater (frequency: 27 kHz), and thus a coating film was formed. Then, film thicknesses were measured in the same manner as in foregoing Example.

Measurement results of the example and comparative example are shown in Table 1 below.

TABLE 1

| | | Mean film thickness (µm) | | | |
| --- | --- | --- | --- | --- | --- |
| | Measuring sites | Left side of tooth | Crest of tooth | Right side of tooth | Root of tooth |
| Example | 1 | 167 | 182 | 182 | 154 |
| | 2 | 171 | 171 | 155 | 153 |
| | 3 | 154 | 186 | 169 | 166 |
| | 4 | 173 | 182 | 176 | 154 |
| Comparative examples | 1 | 164 | 220 | 160 | 130 |
| | 2 | 142 | 204 | 138 | 138 |
| | 3 | 133 | 202 | 142 | 128 |
| | 4 | 135 | 202 | 151 | 130 |

As obvious from Table 1, in Example, a coating film of substantially uniform thickness is formed at the tooth crests, tooth roots or bottom portions, and side portions of the teeth, as compared with Comparative Example.

Second Embodiment

Next, with reference to FIGS. 5A, 5B and 5C in this order, a second embodiment of the manufacturing method for coated articles according to the present invention will be described.

Figure 5A:
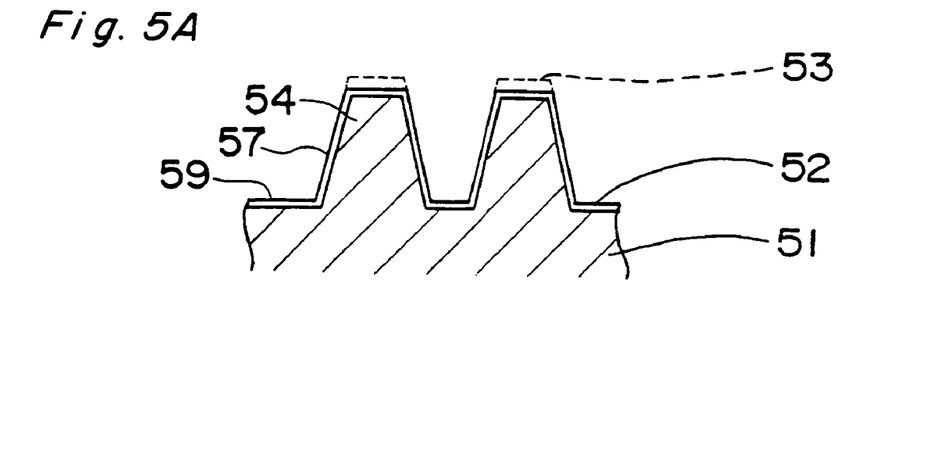
FIGS. 5A, 5B and 5C show an example of coating process on a toothed portion of a spline shaft according to a second embodiment of the invention.

First, as shown in FIG. 5A, a tip portion 53, indicated by broken line, of each of teeth 54 of a spline shaft 51 as an article to be coated is cut off by a specified depth. This cutting depth is set to such a value as can compensate a thickness difference by which in the subsequent electrostatic deposition step, thickness of a powder deposit at the tip portions 53 will be larger than thickness of a powder deposit at sides 57 and troughs or roots 59 of the teeth. For example, this cutting depth is such that the tooth height is lowered by an amount corresponding to 20% of the coating film thickness, although the cutting depth. may be set within such a range that the tooth height is lowered by an amount corresponding to 10%-60% of the coating film thickness, depending on the shape of the teeth.

Next, an undercoat 52 is formed on the entire surface of the spline shaft 51. The undercoat material is made of an organic primer or inorganic primer. As the organic primer, are available epoxy, phenol or polyvinyl acetal resins, rubbers or the like, and those containing oligomers may also be used. The inorganic primer may be those containing magnesium, manganese, silicon or the like. This undercoat 52 plays the role of facilitating the deposition of resin powder 55 to the spline shaft 51 which is a metallic article to be coated.

Figure 5B:
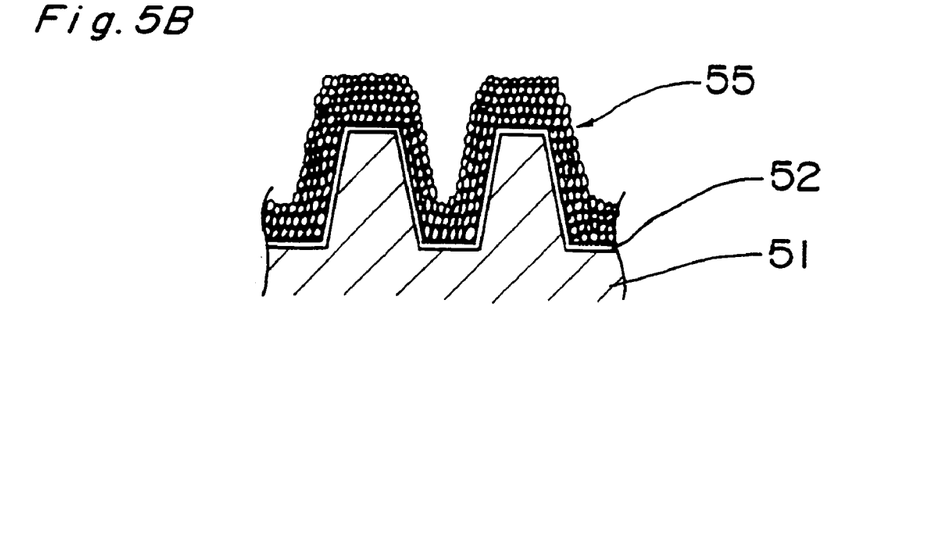

Next, as shown in FIG. 5B, the powder 55 made of a resin material is deposited onto the undercoat 52 by electrostatic coating. In this process, the powder 55 is deposited a specified extent thicker at the tip portions 53 of the teeth 54 than at the other portions.

The resin material constituting the powder 55 may be selected from among thermoplastic resin materials and thermosetting resin materials. More specifically, among the thermoplastic resin materials are nylon materials, olefinic materials, fluoric materials, and others (e.g., PBT (polybutylene terephthalate), PET (polyethylene terephthalate), PPS (polyphenylene sulfide)). Adoptable as the nylon materials are homopolymerized materials, such as 6-nylon, 66-nylon, 46-nylon, 11-nylon, 12-nylon, and aromatic polyamides typified by PPA (polyphthalamide), or materials formulated by adding solid lubricants (e.g., PE (polyethylene), PTFE (polytetrafluoroethylene), $MoS_2$, etc.) and/or filler materials (e.g., calcium carbonate, talc, etc.) to nylon resins. As the olefinic materials, are adoptable PE (e.g., HDPE (high density polyethylene), UHDPE (ultra high density polyethylene), etc.), PP (polypropylene), and the like. As the fluoric materials, are adoptable PTFE (polytetrafluoroethylene), PFA (tetrafluoroethylene perfluoroalklyvinylether copolymer), FEP (tetrafluoroethylene hexafluoropropylene copolymer), ETFE (tetrafluoroethylene ethylene copolymer) and the like. As the thermosetting resin materials, are adoptable epoxy, phenol or other setting resins, and thermosetting polyester base or acrylic resins using crosslinking agents or curing agents.

Figure 5C:
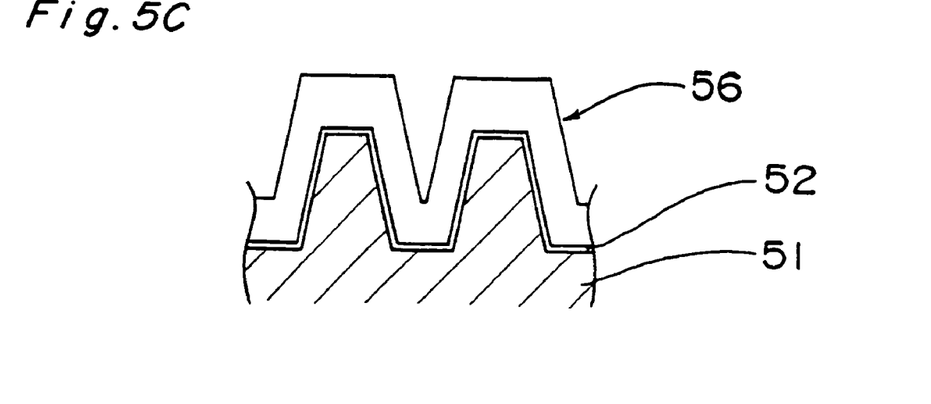
Figure 6:
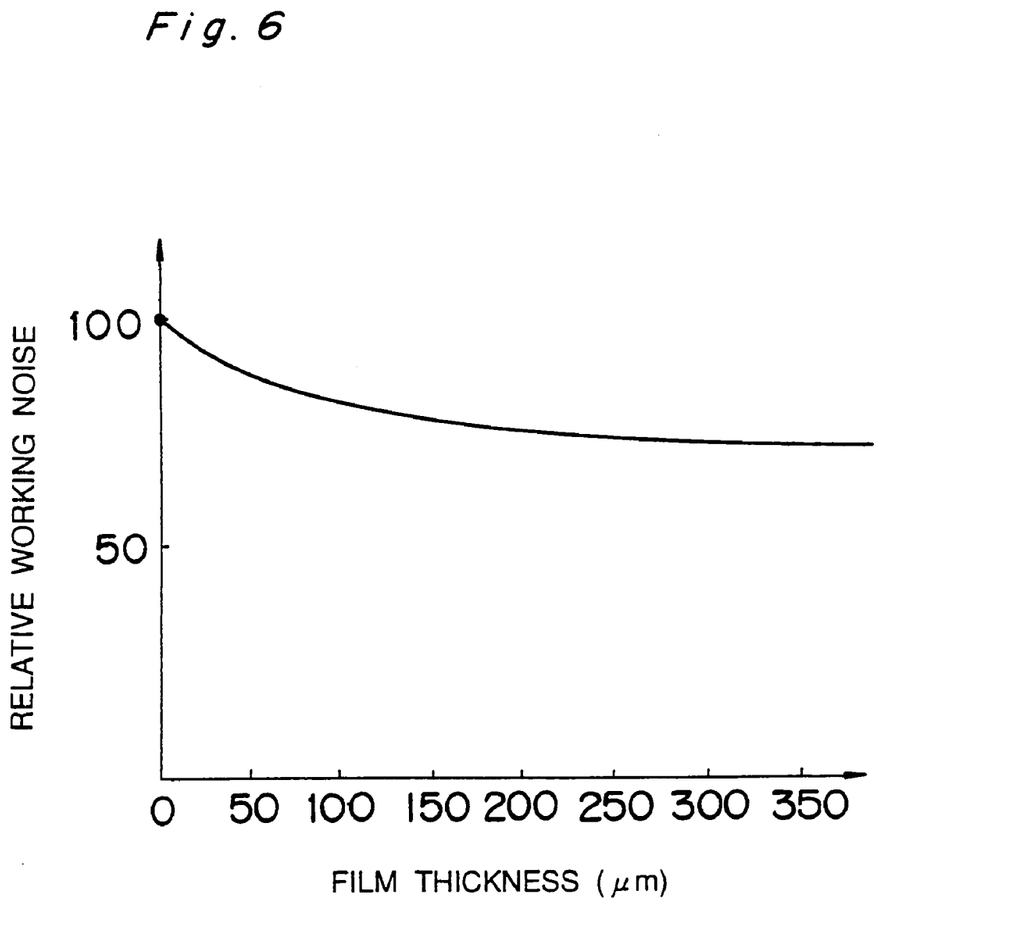
FIG. 6 is a characteristic chart showing a relationship between film thickness and working noise (relative working noise) of a coating film in the second embodiment.
Figure 7:
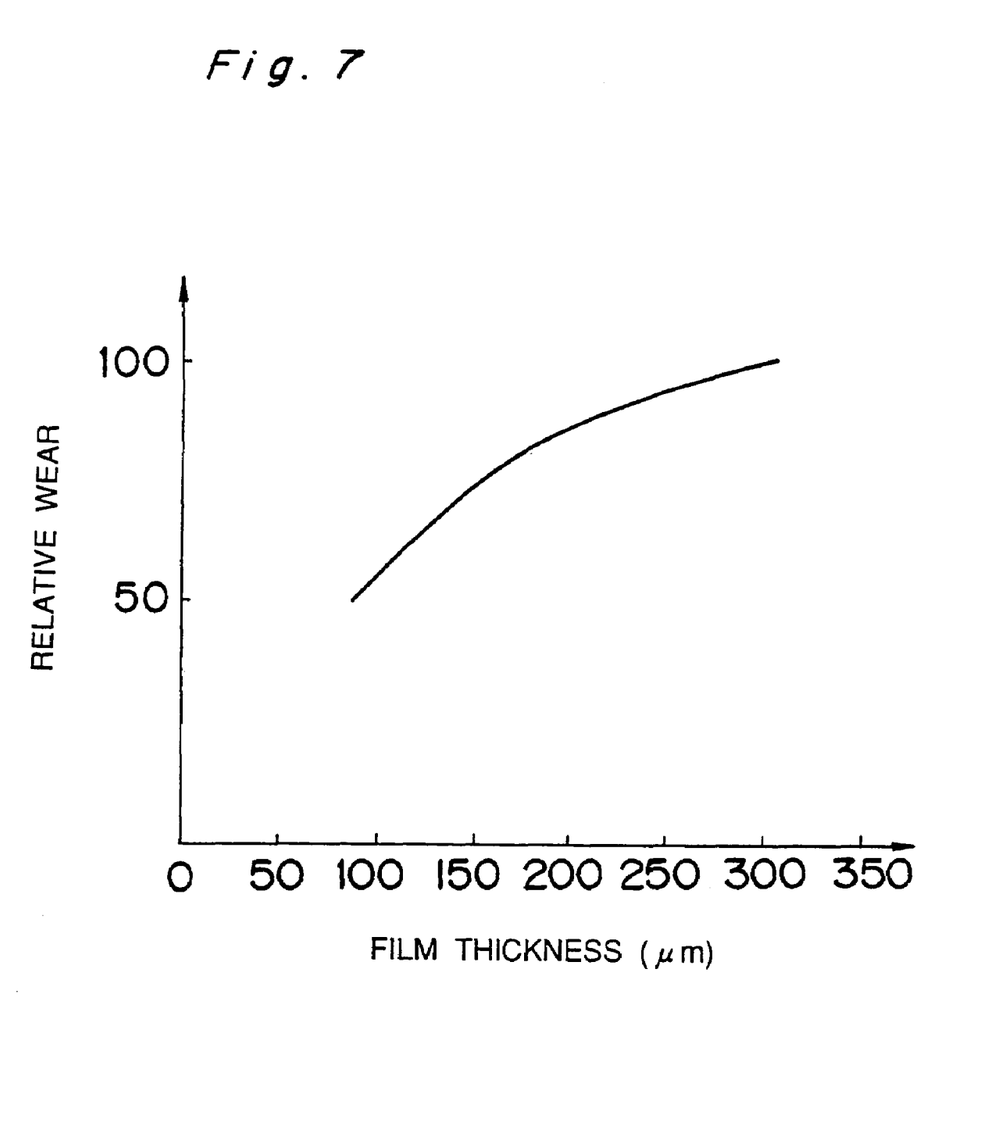
FIG. 7 is a characteristic chart showing a relationship between film thickness and wear (relative wear) of a coating film in the second embodiment.

Next, the spline shaft 51 is electromagnetically induction heated, by which, as shown in FIG. 5C, the powder 55 is melted so that a coating film 56 adheres to the spline shaft 51. In this embodiment, film thickness of this coating film 56 was set to within a range of 100 μm-150 μm. By such a film thickness setting of the coating film 56, as shown in the characteristic chart of FIG. 6, working noise (tap tone) was able to be reduced to 20% or more, compared with the case where the coating film thickness is zero. FIG. 6 shows the working noise in relative values, taking working noise for no coating as a value of 100. Also, according to the above film thickness setting of the coating film 56, as shown in the characteristic chart of FIG. 7 in which wear is given in relative values, taking wear for no coating as a value of 100, wear was able to be reduced by a maximum of 46%, compared with the case where the coating film thickness is 300 μm. As can be understood from the characteristic charts of FIGS. 6 and 7, a working noise reduction effect and wear suppression effect can be obtained by setting the coating film thickness to within a range of 100-250 μm.

Also, according to this embodiment, with the powder 55 electrostatically deposited on the spline shaft 51, the powder 55 is melted, or fused, by induction heating the spline shaft 51. This means that a bed of the powder 55 is heated from the spline shaft 51 inside the powder 55. As a result, air bubbles become more likely to escape out of the internally melted powder 55 to the outside, so that air bubbles are prevented from mixing into the coating film 56, and that the quality of the coating film 56 is improved.

Figure 4A:
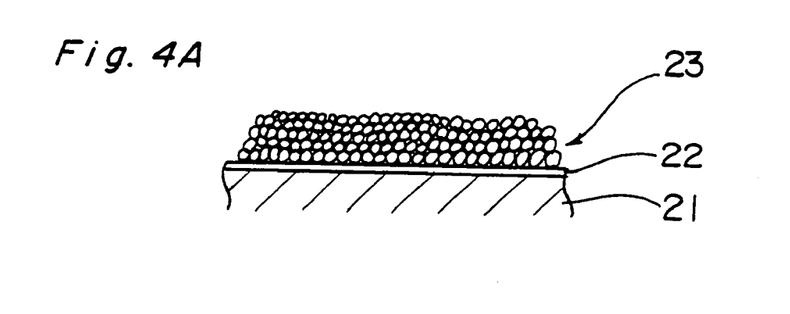
FIGS. 4A and 4B are schematic views showing a process in which powder is fused by electromagnetic induction heating and FIGS. 4C-4D are schematic views showing a process in which powder is fused by oven heating.
Figure 4B:
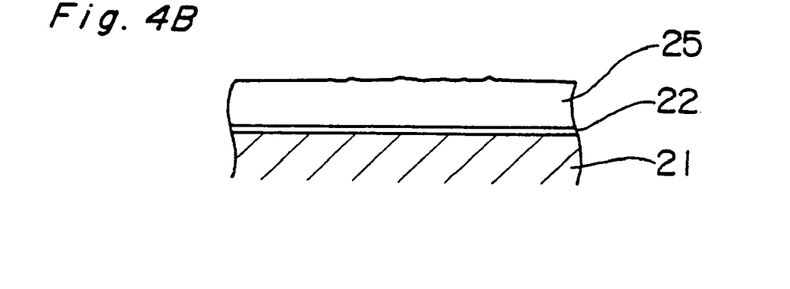

More specifically, as schematically shown in FIG. 4A, in the case of induction heating, after powder 23 is electrodeposited on an article 21 to be coated having an undercoat 22 formed thereon, the article 21 is induction heated, by which the powder 23 present inside near this undercoat 22 first begins to melt. As a result of this, air bubbles among the powder particles 23 become more likely to be let out, so that a coating film 25 substantially free from air bubbles can be formed as shown in FIG. 4B. This effect can be obtained also by preliminarily heating the article and thereafter performing the electrostatic powder coating.

Figure 4C:
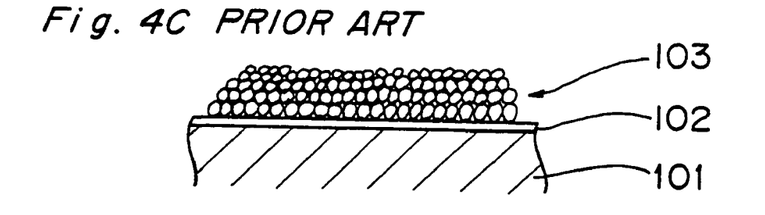
Figure 4D:
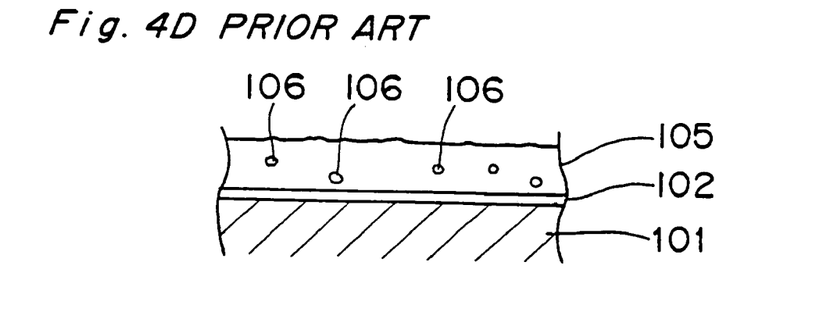

In contrast to this, in the case of oven heating, as shown in FIG. 4C, an article 101 to be coated is heated from outside of powder 103 deposited on the surface of an undercoat 102 of the article 101. As a result, melting of the powder 103 begins with the outermost side of the powder. Therefore, as shown in FIG. 4D, air bubbles 106 among the powder particles 103 are more like to be confined inside a coating film 105.

Further, in this embodiment, the tip portion 53 of each tooth 54 of the spline shaft 51 before being coated is cut by a specified amount so that the spline shaft 51 after being coated comes to have a desired outer diameter. Thus, a secondary finishing process (e.g., broaching) is no longer necessary, allowing the working cost to be reduced.

Whereas a spline shaft 51 to be used as a drive shaft is adopted as an article to be coated in this embodiment, this spline shaft 51 may be either female or male type. The article to be coated may be an intermediate shaft to be used for steering joint. Furthermore, the article to be coated may also be a hypoid gear as a motion transmission (speed reducer) component or a pinion as a pressure generating (gear pump) component. As the material of the article to be coated, steel materials or non-ferrous materials (e.g., aluminum alloys, magnesium alloys, etc.) are adoptable.

Also in this embodiment, the coating film of a specified film thickness may be deposited either partly on the surface of the article to be coated or entirely on the surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making a coated spline shaft, the method comprising:
    electrostatically depositing nylon powder onto a metallic spline shaft to be coated using an electrostatic spray gun while the metallic spline shaft is being rotated around its axis such that the powder is deposited around the entire circumference of the metallic spline shaft at least in a radially outward peripheral region having projections and depressions and that the powder deposited on top of the projections is larger in thickness than the powder deposited at the bottom of the depressions of the metallic spline shaft; and
    melting the powder by induction heating the metallic spline shaft to make a coating film of a thickness of 100 μm to 250 μm adhere to the metallic spline shaft.

2. The method according to claim 1, further comprising cutting tips of the projections of the metallic spline shaft before electrostatically depositing the powder.

3. The method according to claim 1, wherein no finishing process such as broaching is performed after melting the powder.

4. The method according to claim 1, further comprising, before electrostatically depositing the powder, forming an undercoat on the metallic spline shaft.

5. The method according to claim 1, further comprising, before electrostatically depositing the powder, masking portions of the metallic spline shaft that are not targeted for electrostatic powder coating.

6. The method according to claim 1, wherein the induction heating is performed at a frequency of 0.5-100 kHz.

7. The method according to claim 1, wherein the induction heating is performed at a frequency of 1-80 kHz.

8. The method according to claim 1, wherein the induction heating is performed at a frequency of 10-50 kHz.

9. A method of making a coated spline shaft, the method comprising:

electrostatically depositing nylon powder onto a metallic spline shaft to be coated using an electrostatic spray gun while the metallic spline shaft is being rotated around its axis, said metallic spline shaft having projections and depressions, and wherein the powder deposited on top of the projections is larger in thickness than the powder deposited at the bottom of the depressions of the metallic article; and melting the powder by induction heating the metallic spline shaft at a frequency of 0.5-100 kHz to thereby make a coating film of a thickness of 100 μm to 250 μm adhere to the metallic spline shaft.

10. The method according to claim 9, further comprising cutting tips of the projections of the metallic spline shaft before electrostatically depositing powder.

11. The method according to claim 9, wherein no finishing process such as broaching is performed after melting the powder.

12. The method according to claim 9, further comprising, before electrostatically depositing the powder, forming an undercoat on the metallic spline shaft.

13. The method according to claim 9, wherein electrostatically depositing the powder is performed such that the powder deposited on top of the projections is larger in thickness than the powder deposited in other parts of the metallic spline shaft.

14. The method according to claim 9, further comprising, before electrostatically depositing the powder, masking portions of the metallic spline shaft that are not targeted for electrostatic powder coating.

15. The method according to claim 9, wherein the induction heating is performed at a frequency of 1-80 kHz.

16. The method according to claim 9, wherein the induction heating is performed at a frequency of 10-50 kHz.

17. The method according to claim 9, wherein the electrostatically depositing the powder comprises electrostatically depositing the powder onto the metallic spline shaft while the metallic spline shaft is being rotated around its axis such that the powder is deposited around the entire circumference of the metallic spline shaft at least in a radially outward peripheral region having the projections and the depressions, wherein the powder deposited on top the projections is larger in thickness than the powder deposited in other parts of the metallic spline shaft.

* * * * *